United States Patent [19]

Moore-McKee et al.

[11] Patent Number: 5,648,898
[45] Date of Patent: Jul. 15, 1997

[54] METHOD FOR PROGRAMMING A VEHICLE MONITORING AND CONTROL SYSTEM

[75] Inventors: Amy L. Moore-McKee, Varna; J. Martin Hadank, Dunlap; Stephen J. Jackson; Sysounanh M. Pradaxay, both of Peoria, all of Ill.; Kenneth J. McGuire, Garner, N.C.

[73] Assignee: Caterpillar Inc., Peoria, Ill.

[21] Appl. No.: 359,317

[22] Filed: Dec. 19, 1994

[51] Int. Cl.⁶ ........................................... G05B 19/42
[52] U.S. Cl. ........................... 364/191; 364/424.034
[58] Field of Search .............................. 364/146, 147, 364/188, 191, 192, 550, 488, 424.01, 424.03, 424.04; 395/700, 922

[56] References Cited

U.S. PATENT DOCUMENTS

| | | |
|---|---|---|
| 4,841,441 | 6/1989 | Nixon et al. . |
| 4,924,418 | 5/1990 | Bachman et al. ................ 364/550 |
| 4,996,643 | 2/1991 | Sakamoto et al. ............ 364/424.03 |
| 5,023,800 | 6/1991 | Carver et al. . |
| 5,067,129 | 11/1991 | Evans et al. . |
| 5,070,534 | 12/1991 | Lascelles et al. . |
| 5,084,813 | 1/1992 | Ono . |
| 5,119,479 | 6/1992 | Arai et al. . |
| 5,142,469 | 8/1992 | Weisenborn .......................... 364/146 |
| 5,197,016 | 3/1993 | Sugimoto et al. .................. 364/488 |
| 5,212,645 | 5/1993 | Wildes et al. . |
| 5,251,122 | 10/1993 | Sakamoto et al. ................. 364/147 |
| 5,371,487 | 12/1994 | Hoffman et al. .............. 364/424.03 |
| 5,473,540 | 12/1995 | Schmitz ........................ 364/424.03 |
| 5,481,716 | 1/1996 | Morshedi et al. ................. 395/700 |

Primary Examiner—Paul P. Gordon
Assistant Examiner—Steven R. Garland
Attorney, Agent, or Firm—James R. Yee

[57] ABSTRACT

A method of operating a computer to automatically produce control software for an information manager on a machine is provided. The information manager is adapted to display information relating to the machine. The method includes the steps of (1) as a function of operator input, defining a set of information manager specifications; and (2) producing control software to operate the information manager as specified by said specifications.

23 Claims, 13 Drawing Sheets

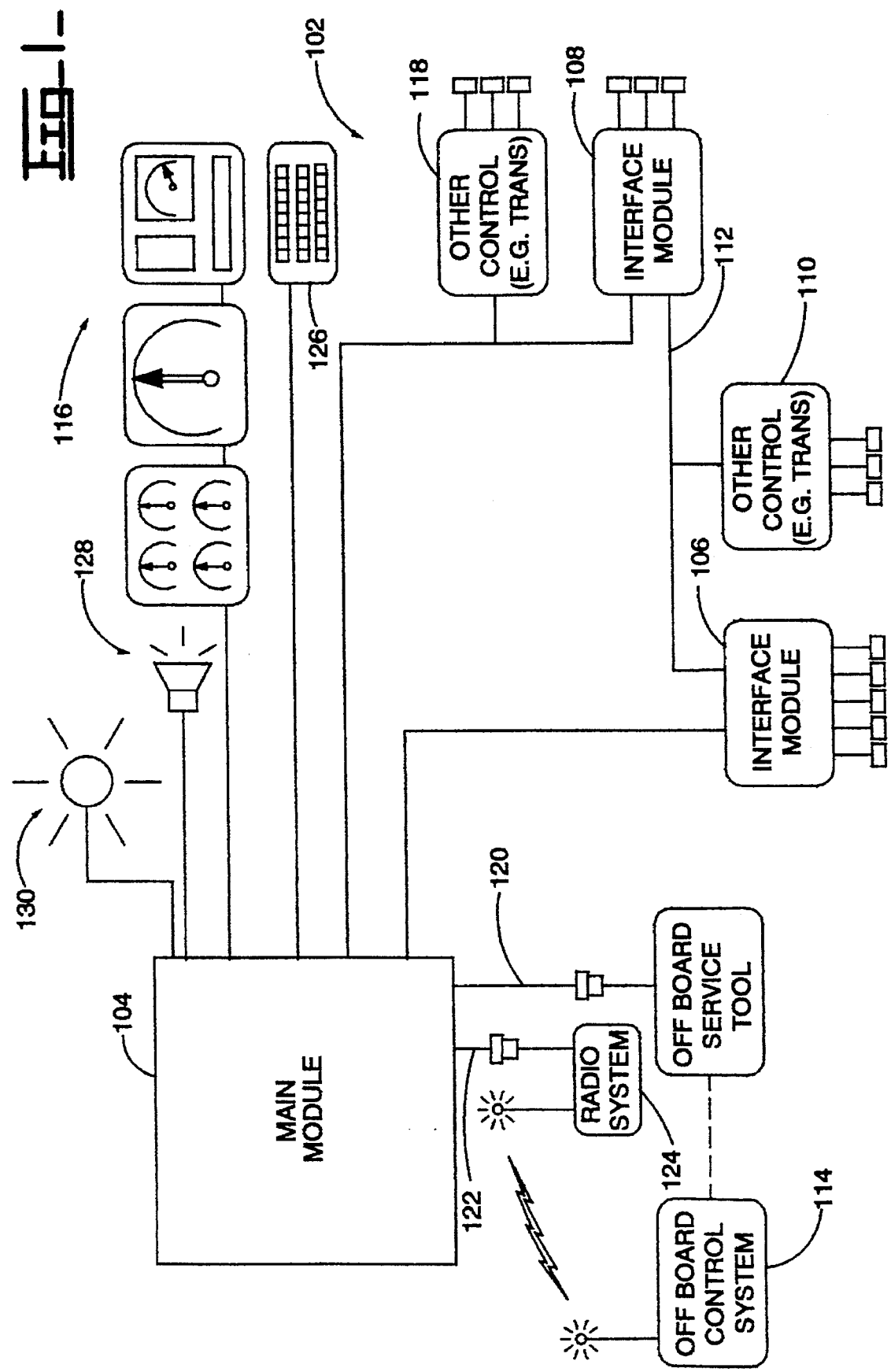

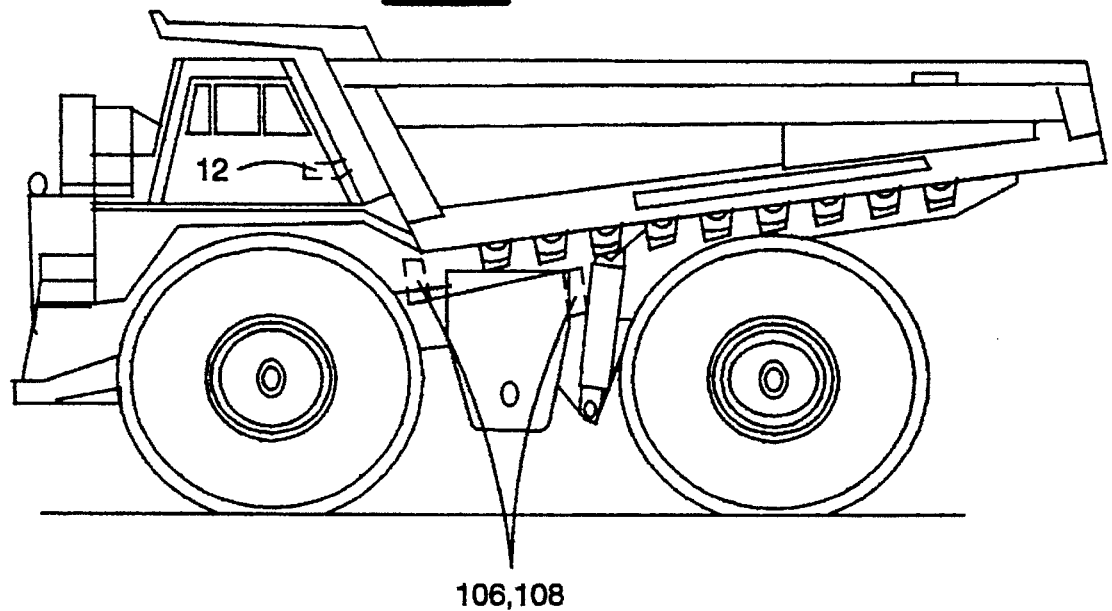
Fig_2A_
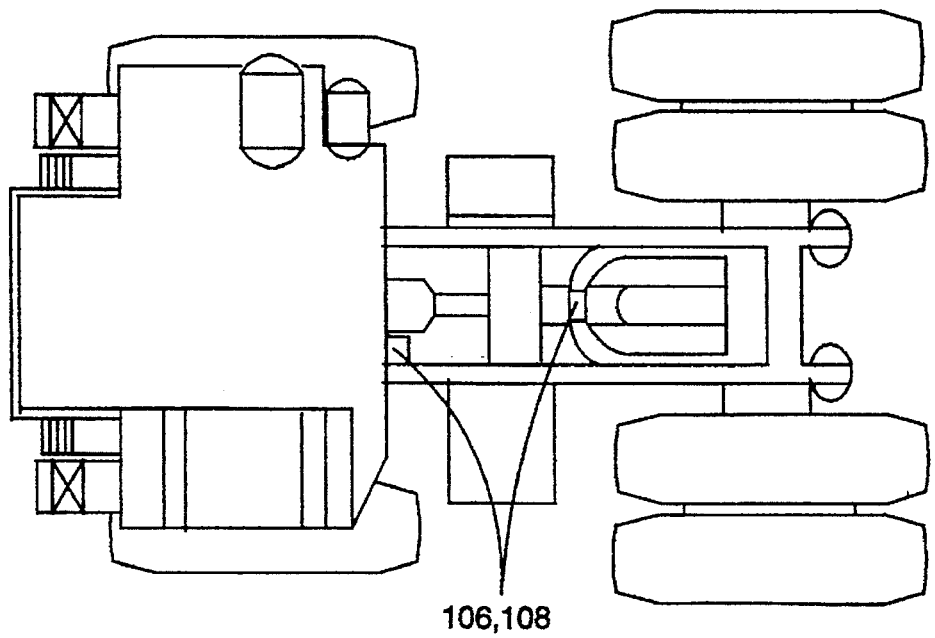
Fig_2B_

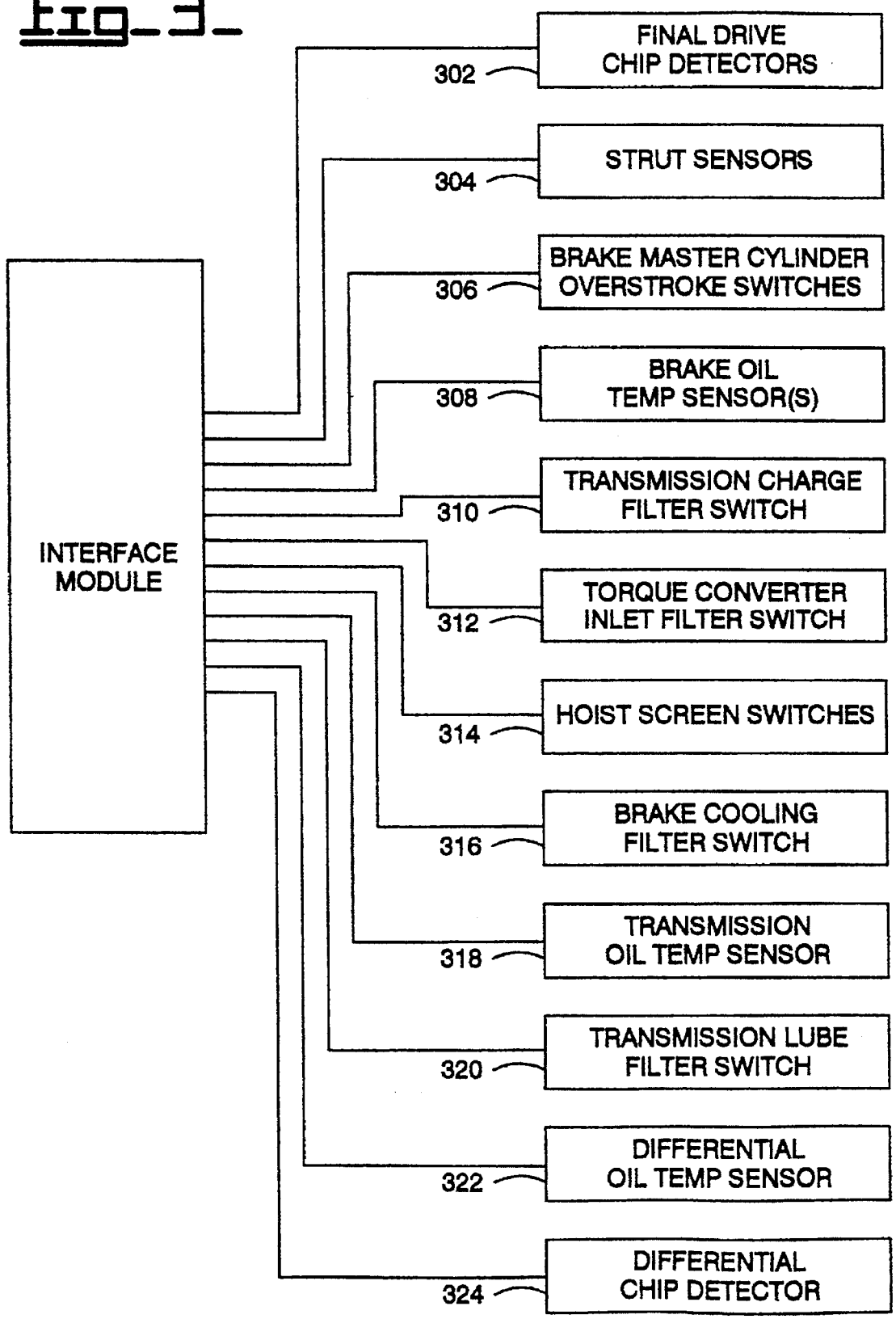

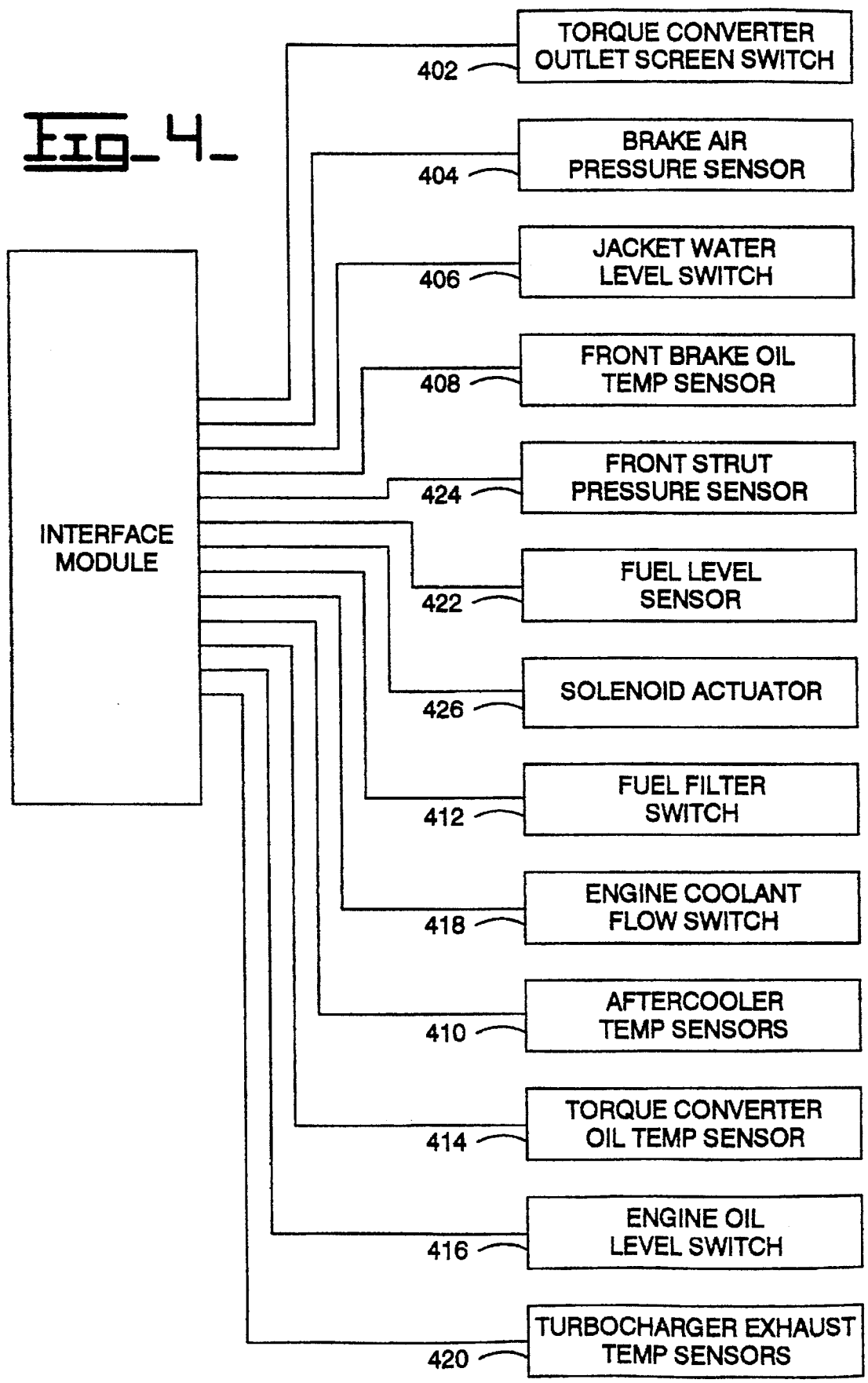

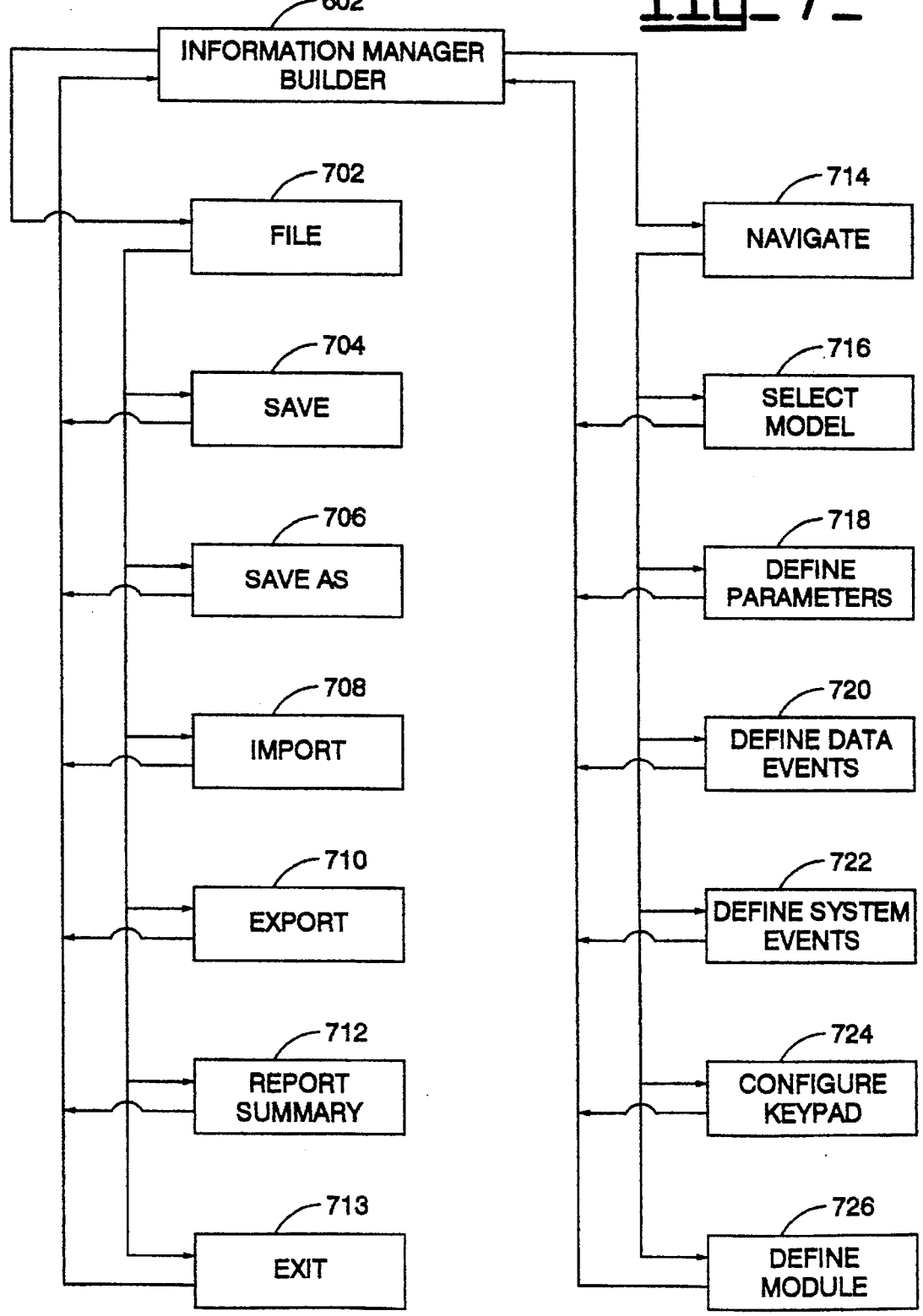
Fig_7_

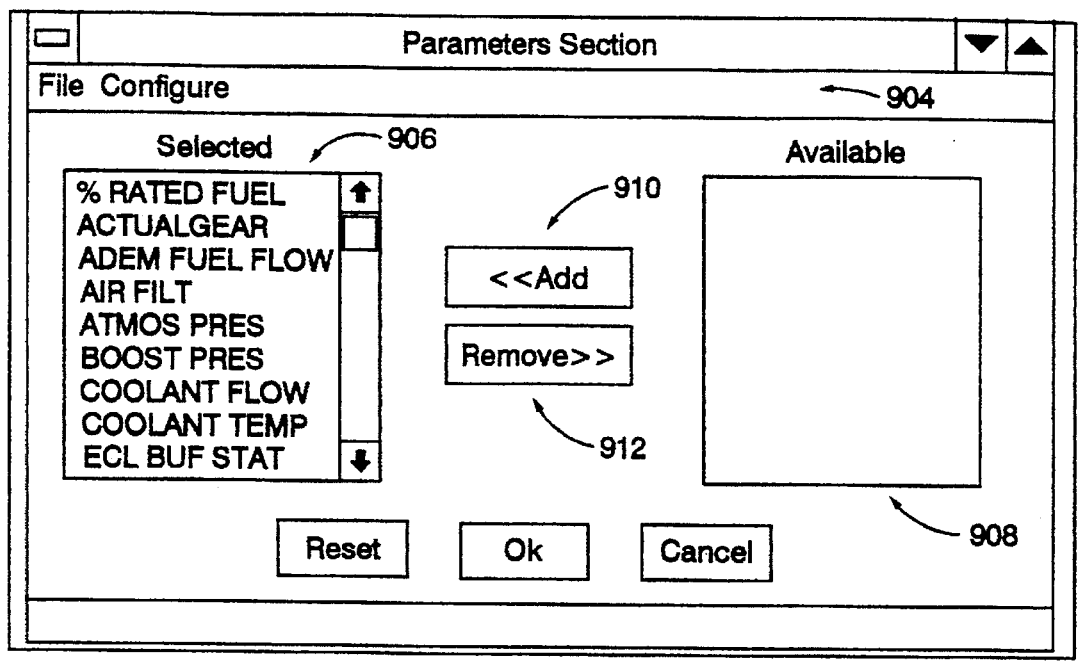
Fig_9_
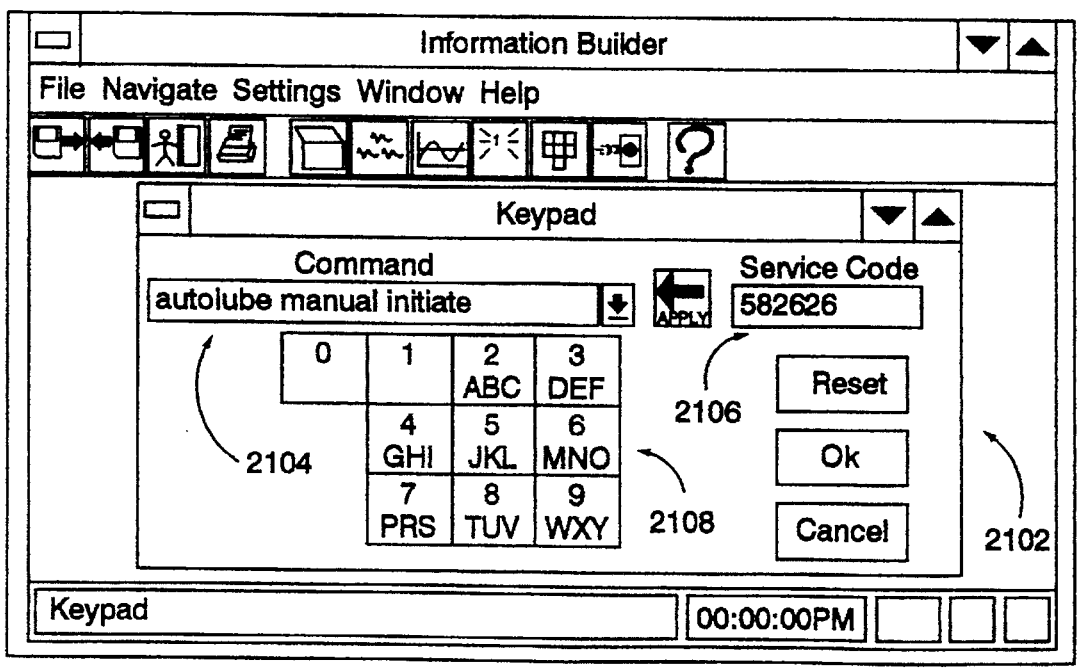
Fig_21_

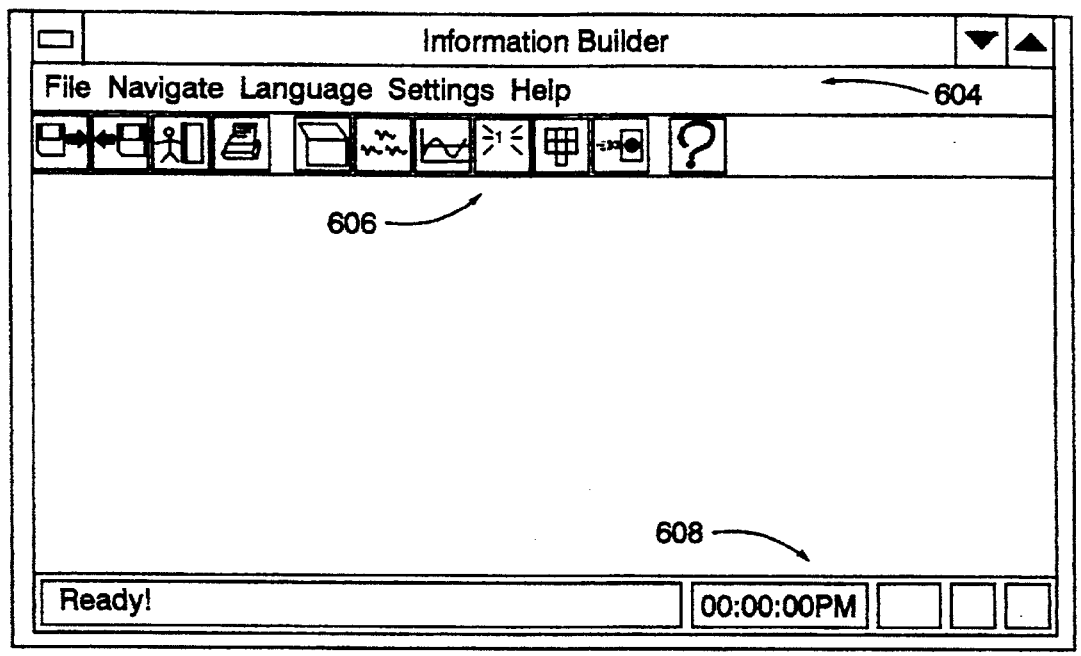
Fig_6_
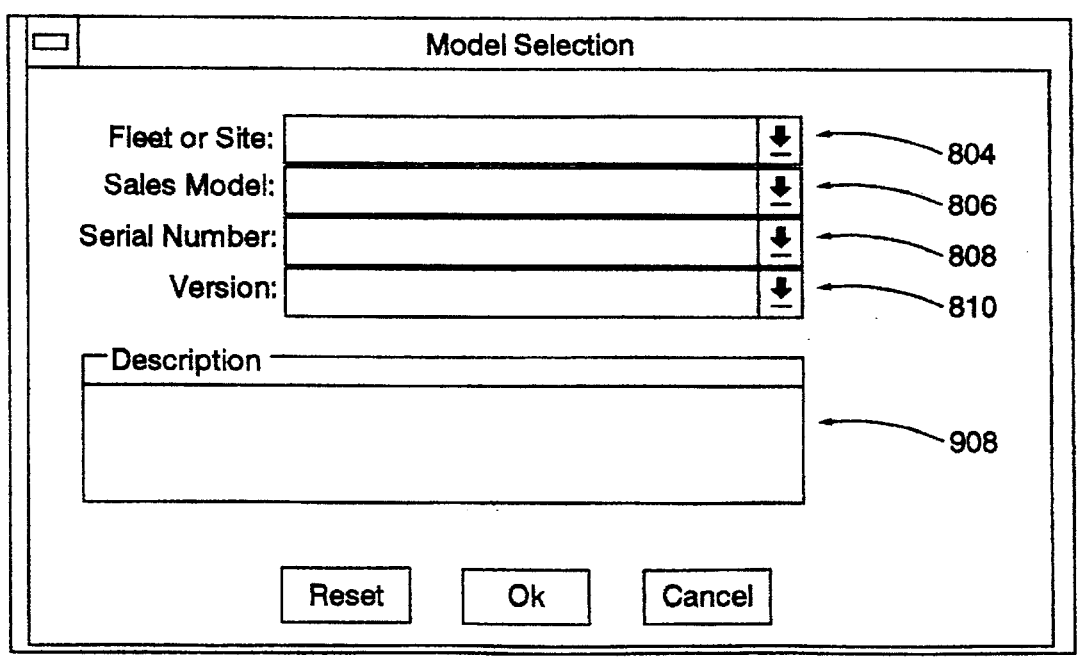
Fig_8_

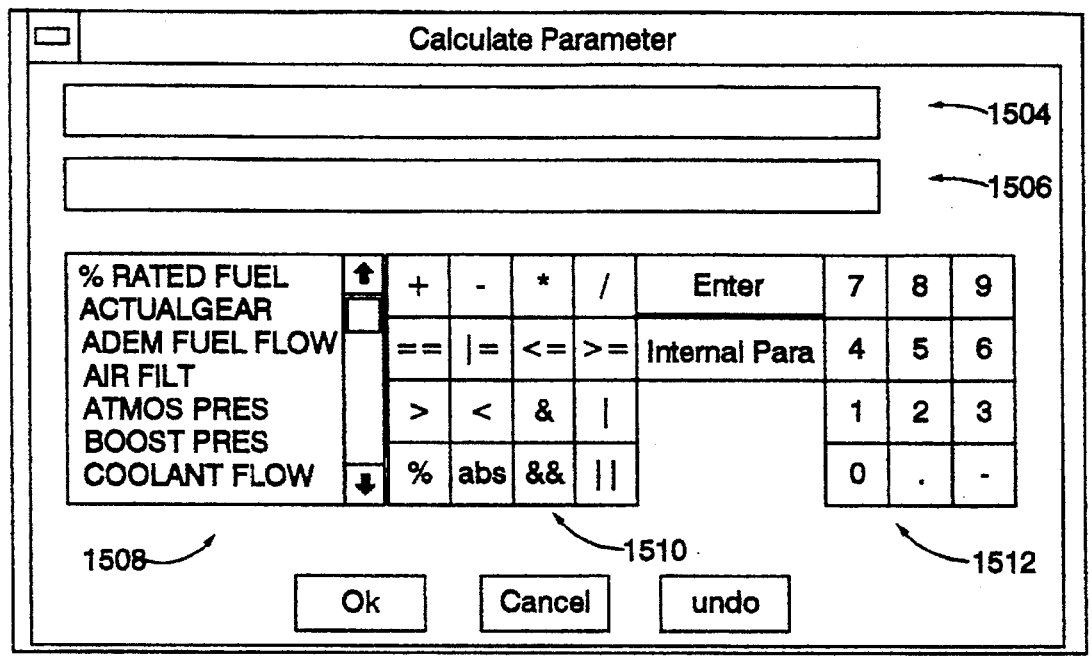
Fig_15_
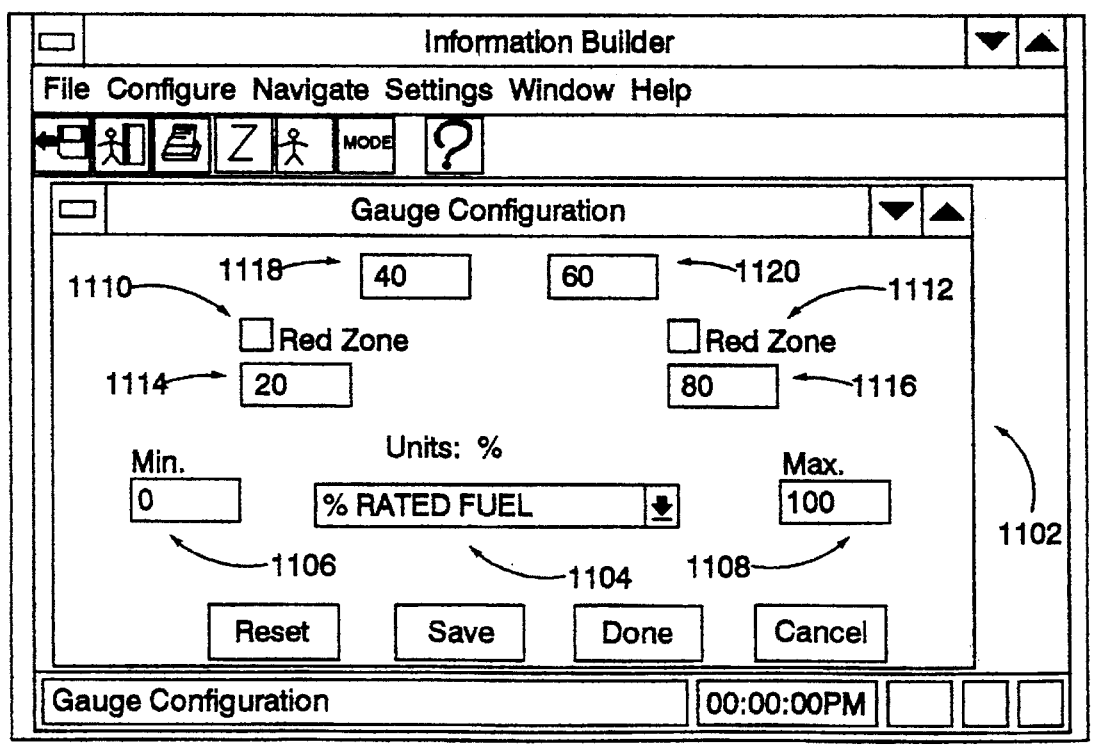
Fig_11_

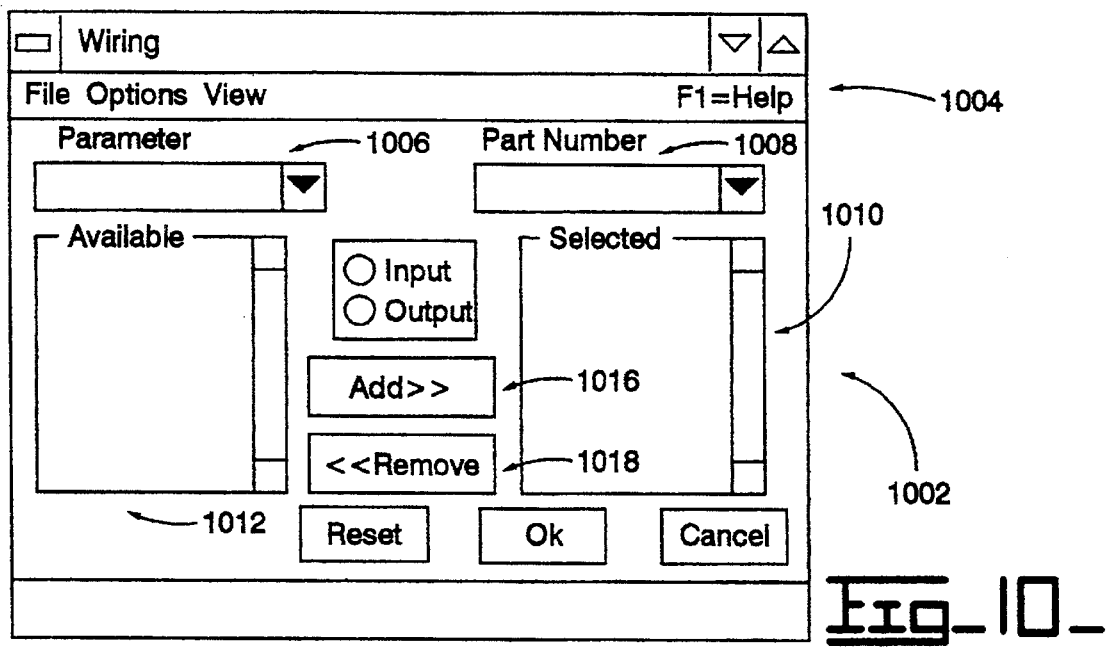
Fig_10_
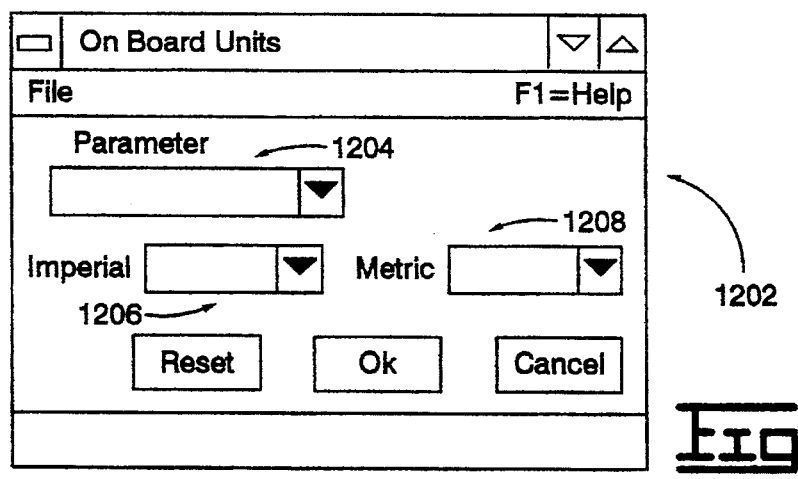
Fig_12_
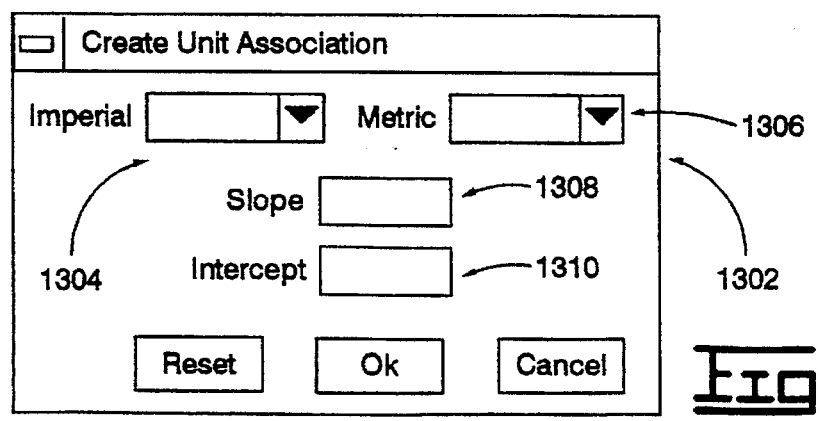
Fig_13_

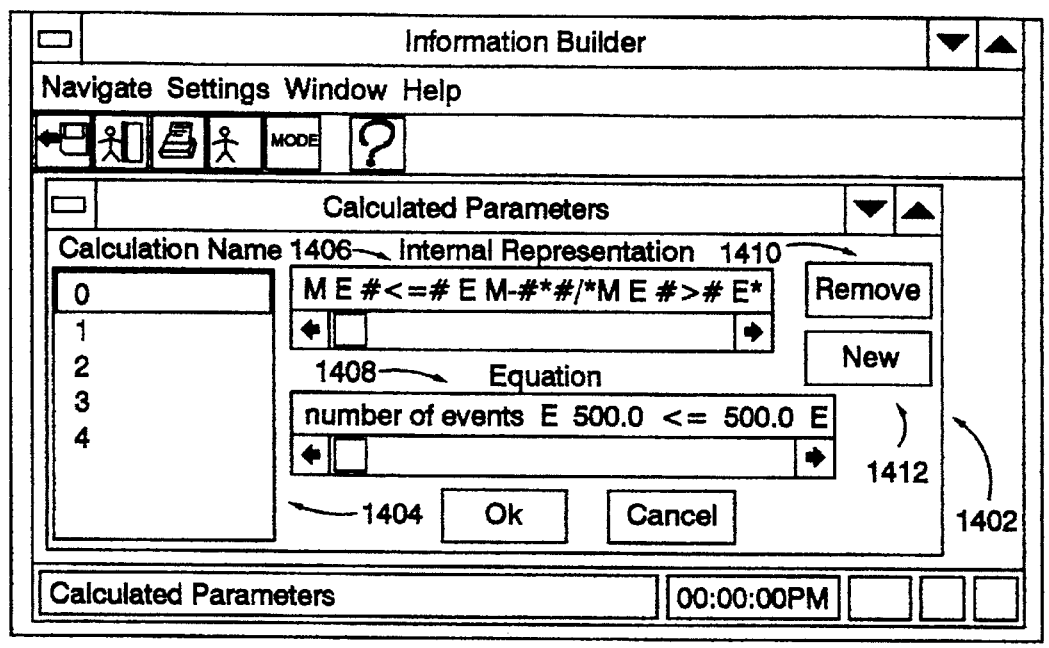
Fig_14_
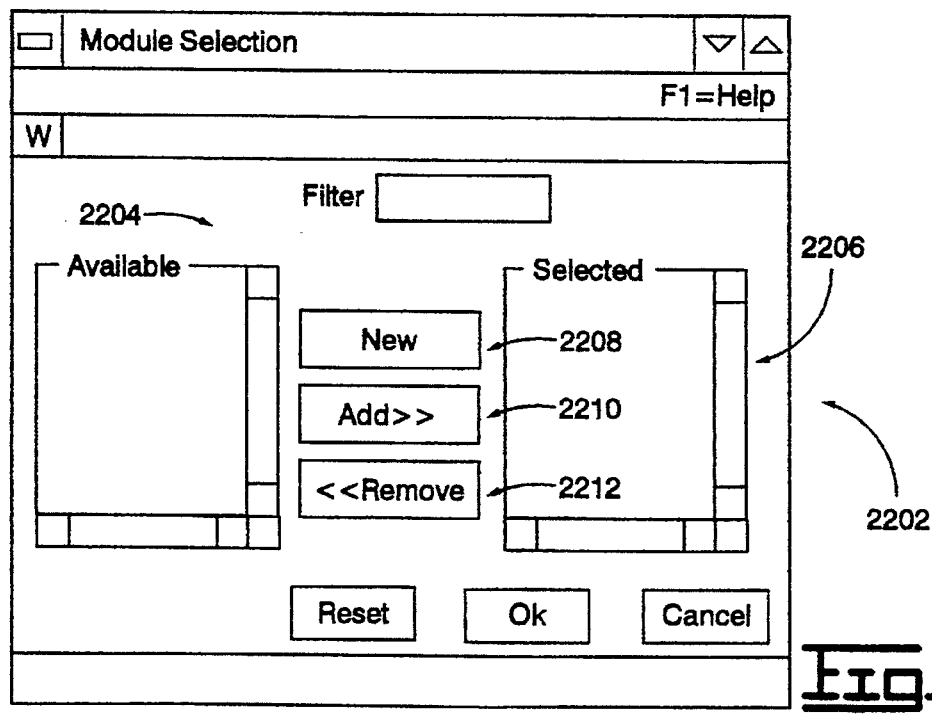
Fig_22_

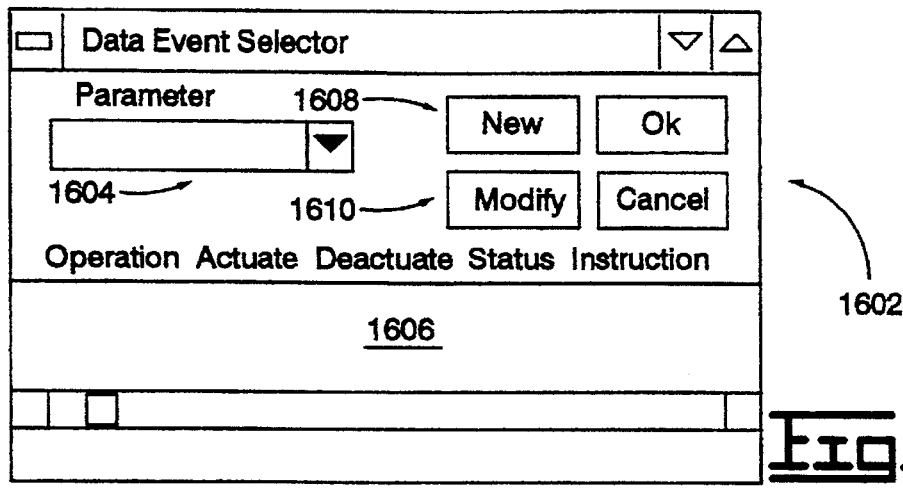
Fig_16_
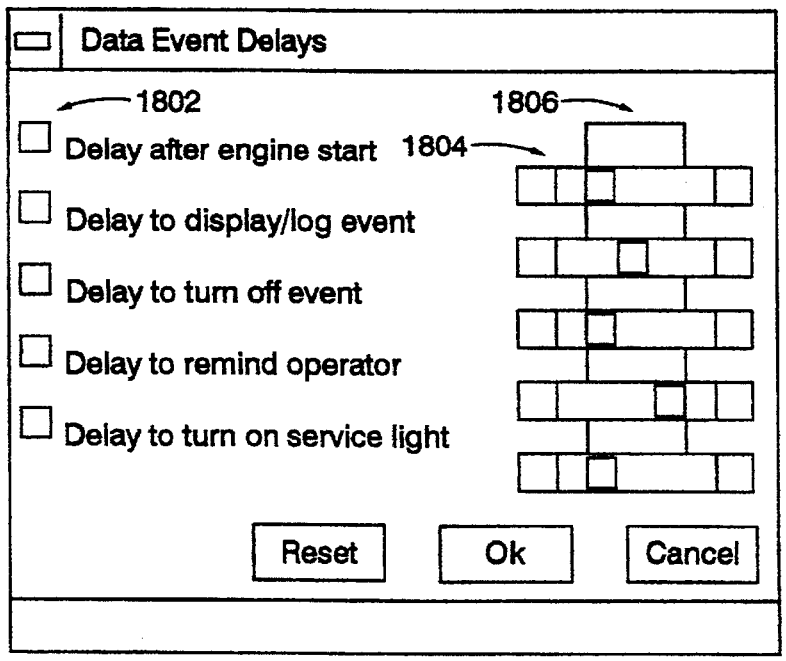
Fig_18_
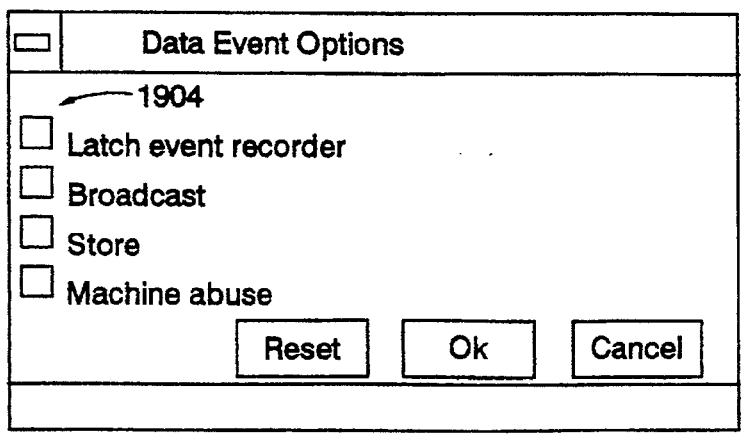
Fig_19_

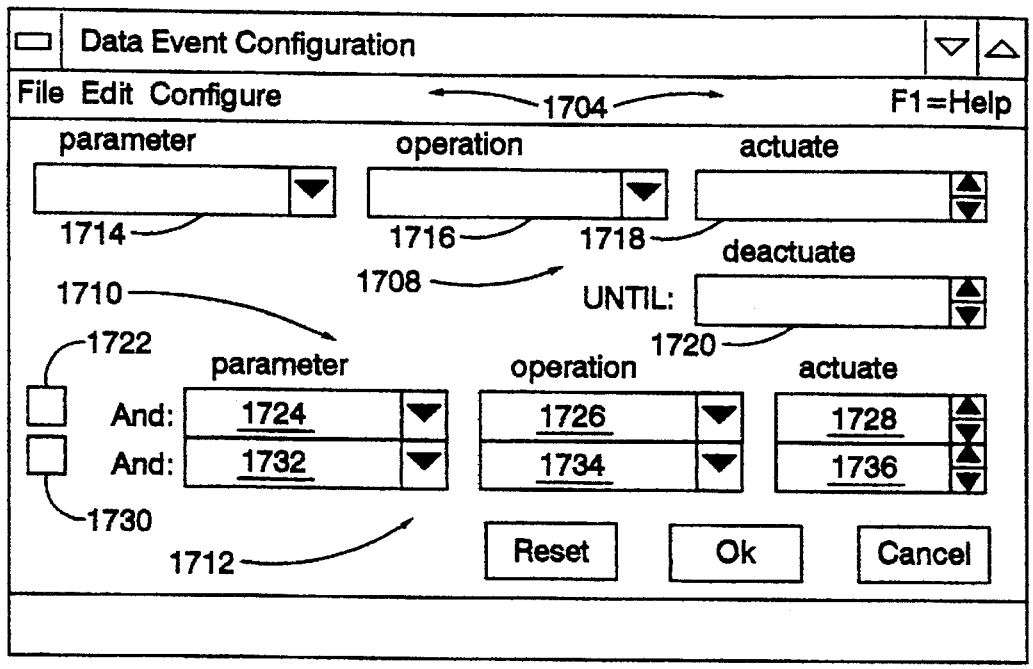
Fig_17_
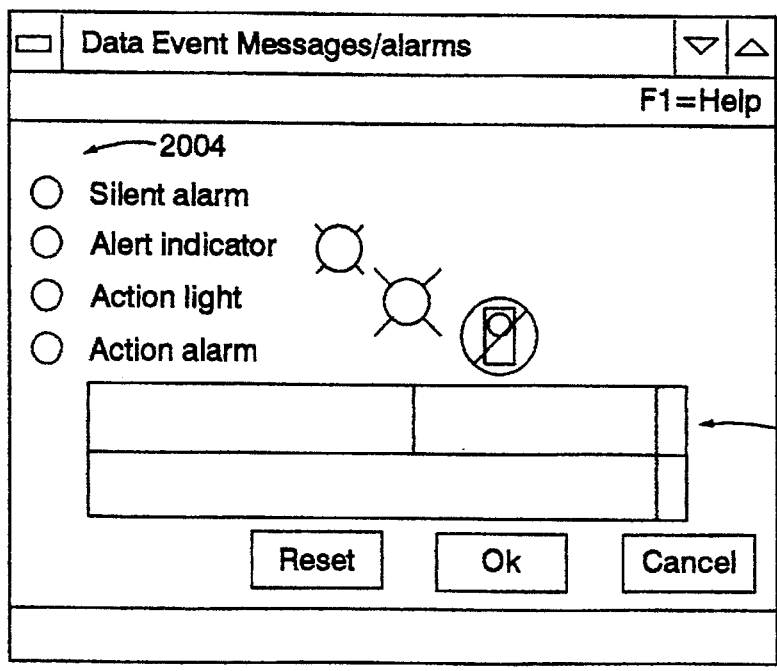
Fig_20_

METHOD FOR PROGRAMMING A VEHICLE MONITORING AND CONTROL SYSTEM

I. TECHNICAL FIELD

This invention relates generally to a vehicle monitoring and control system and more particularly to a method for programming a vehicle monitoring and control system based on operator input.

II. BACKGROUND ART

Vehicle monitoring systems are often included in connection with large work vehicles such as off-highway mining trucks, front shovels, over-the-highway trucks, and the like. For example, the system disclosed in U.S. Pat. No. 5,079,727 issued to Yasue et al. on Jan. 7, 1992 includes a plurality of sensors located throughout the vehicle for use by a control center.

Many vehicle monitoring systems include some form of communication network to allow various control systems and displays to transmit and receive information obtained from sensors located on the vehicle. Information from one of the sensors on the vehicle will often need to be shared with various controls and displays. Similarly, individual controls will often have fewer inputs than the number of sensors from which it must receive information. These considerations have led to communication networks in which various controls are able to communicate with each other and have also led to the use of sensor interfaces that are connected to multiple sensor inputs. The sensor interfaces multiplex the sensor signals and transmit the information to other controls via a data bus. Such a system is disclosed in U.S. Pat. No. 4,804,937 issued to Barbiaux et al. on Feb. 14, 1989. The system disclosed in Barbiaux et al. provides for a bus type configuration in the communication network.

The evolving complexity and use of vehicle management systems has demanded increasing design time. Each machine or vehicle management system application is different, requiring a different set of sensors and being connected to a different set of different controls and/or displays. Thus, a vehicle management system must be designed for each different application.

Therefore, it became desirable to have a basic vehicle management system or platform which is flexible. The vehicle management platform can be adapted/configured to work on various types, models, series or configurations of machines. However, each machine or application has different requirements and specifications. Each system has different sensors, different displays, and connects to different modules. Thus, application of the basic system still requires significant engineering design time and software engineer programming.

The present invention is directed to overcoming one or more of the problems set forth above.

III. Disclosure of the invention

In one aspect of the present invention, a method of operating a computer to automatically produce control software for an information manager on a machine is provided. The information manager is adapted to display information relating to the machine. The method includes the steps of: (1) as a function of operator input, defining a set of information manager specifications and (2) producing control software to operate the information manager as specified by the specifications.

In another aspect of the present invention, a method of operating a computer to automatically produce control software for an information manager on a machine. The information manager is adapted to display information relating to the machine. The method includes the steps of (1) as a function of operator input, defining a configuration of the machine; (2) setting a set of information manager specifications to defaults as specified by said configuration; (3) as a function of operator input, modifying said a set of information manager specifications; and (4) producing control software to operate the information manager as specified by the specifications.

IV. BRIEF DESCRIPTION OF THE DRAWINGS

For a better understanding of the present invention, reference may be made to the accompanying drawings, in which:

FIG. 1 is a diagrammatic illustration of a vehicle monitoring and control system;

FIG. 2a is a diagrammatic illustration of the location of the interface modules on an exemplary machine from a side view of the machine;

FIG. 2b is a diagrammatic illustration of the location of the interface modules on an exemplary machine from a bottom view of the machine;

FIG. 3 illustrates the connections of a first interface module in one embodiment of the present invention;

FIG. 4 illustrates the connections of a second interface module in one embodiment of the present invention.

FIG. 6 is a diagrammatic illustration of the main screen of the present invention or Information Systems Builder;

FIG. 7 is a flow diagram of the options available under a File menu and a Navigate menu of the main screen of FIG. 6;

FIG. 8 is a diagrammatic illustration of a Model Selection screen of the present invention;

FIG. 9 is a diagrammatic illustration of a Parameter Selection screen of the present invention;

FIG. 10 is a diagrammatic illustration of a Wiring screen of the present invention;

FIG. 11 is a diagrammatic illustration of a Gauge Configuration screen;

FIG. 12 is a diagrammatic illustration of an On Board Units screen;

FIG. 13 is a diagrammatic illustration of a Create Unit Association screen;

FIG. 14 is a diagrammatic illustration of a Calculated Parameters screen;

FIG. 15 is a diagrammatic illustration of a Calculate Parameter screen;

FIG. 16 is a diagrammatic illustration of a Data Event Selector screen;

FIG. 17 is a diagrammatic illustration of a Data Event Configuration screen;

FIG. 18 is a diagrammatic illustration of a Data Event Delays screen;

FIG. 19 is a diagrammatic illustration of a Data Event Options screen;

FIG. 20 is a diagrammatic illustration of a Data Event Messages/Alarms screen;

FIG. 21 is a diagrammatic illustration of a Keypad screen; and

FIG. 22 is a diagrammatic illustration of a Module Selection screen.

V. Index

Figure 5:
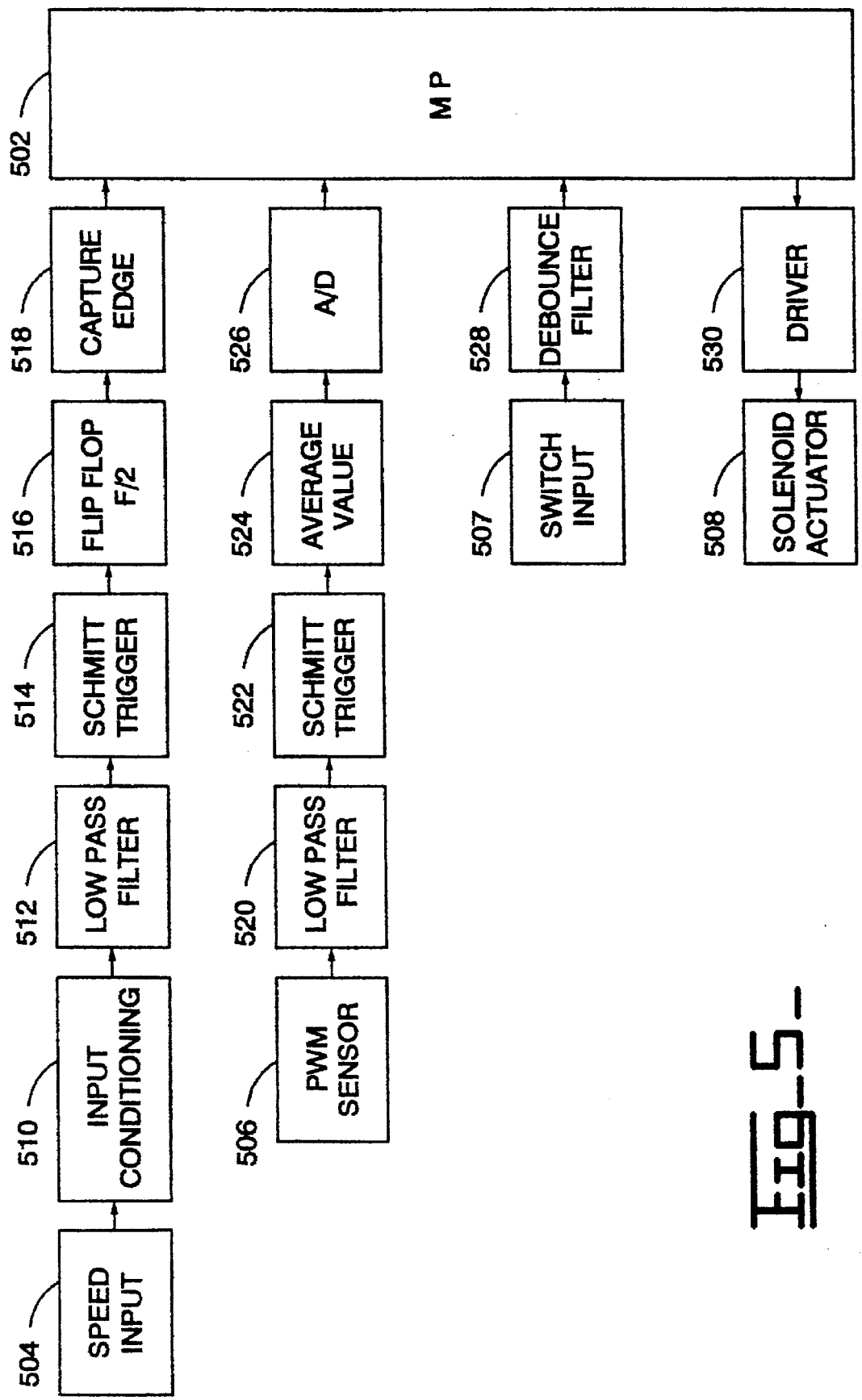
FIG. 5 is a diagrammatic illustration of one embodiment of an interface module.

I. Technical Field
II. Background Art
III. Disclosure of the Invention
IV. Brief Description of the Drawings V. Index
VI. Best Mode for Carrying Out the Invention
   A. Copyright
   B. Introduction
   C. Vehicle Monitoring System
   D. Inputting the Target Information Manager's Specifications
      1. Select Model
      2. Define Parameters
         a. Wiring
         b. Gauges
         c. Units
         d. Calculated Parameters
      3. Define Data Events
         a. Data Event Configuration
         b. Data Event Delays
         c. Data Event Options
         d. Data Event Messages/Alarms
      4. System Events
      5. Configure Keypad
      6. Module
      7. Other Functions
      8. Arrangement of Menus and Tool Buttons
   E. Security
   F. Producing the Control Software
VII. Industrial Applicability
Claims
Abstract

VI. Best Mode for Carrying Out the Invention

A. Copyright

Portions of the disclosure of this patent document contain material which is subject to copyright protection. The copyright owner has no objection to the facsimile production by anyone of the patent document or the patent disclosure, as it appears in the Patent and Trademark Office patent file or records, but otherwise reserves all copyright rights whatsoever.

B. Introduction

Referring to the Figures., the present invention or Information Systems Builder (ISB) provides a method of operating a computer to automatically produce control software for an information manager 102 on a machine. The information manager or vehicle monitoring system 102 is adapted to display information relating to the machine.

The information systems builder generally allows for operator input of the specifications of the target information manager and produces the control software for the information systems builder. In the preferred embodiment, the information systems builder utilizes a database of software code and the user defined parameter information and configuration data. The parameter information and configuration data is converted into a binary format and placed in a binary file. The binary file is then downloaded to the target information manager for testing. A database includes sets of default parameters and configurations which are dependent upon choices made by the operator.

The present invention is embodied in a computer. The computer is programmed to receive operator input and to produce the control software. The operator inputs the parameters of the target information manager (IF) as discussed below. The computer may be a microcomputer, a mainframe, a general purpose computer, or any suitable computer system. In the preferred embodiment, the present invention is embodied in a programmed general purpose computer.

Preferably, the Information Systems Builder is embodied in a Windows program. In the preferred embodiment, the present invention is implemented with the following requirements:

| Hardware: | Intel 386 microprocessor or better, 4 MB ram; |
|---|---|
| Operating System: | DOS 5.0, Windows 3.1 or later or MS Windows NT. |
| Implementation: | Digitalk Smalltalk/V 2.0.2 |
| File Manager: | Novell Btrieve |
| Utility Functions: | Microsoft Win32s for Windows 3.1 |

The present invention is designed to be used in the development of control software for an information manager. The information manager may be a new design or a new configuration built on a common platform. The present invention provides a method whereby a user, knowing the specifications of the target information manager, inputs the specifications of the target information manager and the control software is automatically produced. The user does not have to be a computer programmer or have any computer programming experience.

With reference to FIG. 6, the main screen of the Information Manager Builder (IMB) is illustrated. The main screen 602 includes a pull down menu bar 604 with a plurality of pull down menus and a tool bar 606 with a plurality of tool buttons. A status bar 608 gives information relating to the status of the Information Systems Builder. The tool buttons provide short-cut control to specific operations. In the preferred embodiment, the pull-down menus includes "File", "Navigate", "Language", and "Settings", and "Help". The pull down menus have the following structure and functions:

| File: | |
|---|---|
| "Open": | opens a machine configuration file or database; |
| "Save": | opens a screen with the query "Memorize current state?", (Yes, No, Cancel). If "Yes", then a memorize function is performed; |
| "Save As": | opens a screen with the query "Memorize current state?", (Yes, No, Cancel). Saves current configuration to a new file ar database; |
| "Import": | reads a binary file containing parameter and configuration information; |
| "Export": | exports the defined configuration and parameter information. See, Part VI.E. |
| "Summary Report": | generates a print report of the current configuration; |
| "Exit": | terminates Information Manager Builder. |

At different points in during operation, one or more of the above menus are deactivated. Additionally, whenever a screen is opened, the File menu also contains the following options:

| "Reset": | resets the current screen to the default values; |
|---|---|
| "OK": | saves the current information and |

| | |
|---|---|
| | closes the current screen and returns to the prior active screen. |
| "Cancel": | closes the current screen without saving the current information. |
| Navigate: | |
| "Models": | opens Model Selection screen. See, Part VI.C.1. |
| "Parameters": | opens Parameter Selection screen. See, Part VI.C.2. |
| "Data Events": | opens Data Event Selection screen. See, Part VI.C.3. |
| "System Events": | opens System Data Event Selection screen. See, Part VI.C.4. |
| "Keypad": | opens to Keypad Configuration screen. See, Part VI.C.5. |
| "Modules": | opens to Module Selection screen. See, Part VI.C.6. |
| Preferences: | |
| Language: | allows changing the default language; |
| Settings: | allows changing of certain settings, e.g., default directories, menus, etc . . . |
| Help: | opens Information Systems Builder Help Files. |

With reference to FIG. 7, the operation of the File and Navigate menus of the Information Manager Builder main screen 602 is demonstrated. As mentioned above, the options under the File menu 702 are Save 704, Save As 706, Import 708, Export 710, Report Summary 712 and Exit 713. After options Save 704, Save As 706, Import 708, Export 710, Report Summary 712 are executed, the system returns to the Information Systems Builder main screen 602. Likewise, after the options under the Navigation menu 714 are executed, the system returns to the Information Systems Builder main screen 602. As mentioned above, the options under the Navigate menu are Model 716, Parameters 718, Data Events 720, System Events 722, Keypad 724, and Module 726.

C. Vehicle Monitoring System

With reference to FIGS. 1–5 in the preferred embodiment, the vehicle monitoring system (VMS) 102 is a data acquisition, analysis, storage, and display system for work vehicles or machines. Employing a complement of on-board and off-board hardware and software, the vehicle monitoring system 102 will monitor and derive vehicle component information and make such information available to the operator and technical experts in a manner that will improve awareness of vehicle operating conditions and ease diagnosis of fault conditions. Generally, the VMS 102 is a flexible configuration platform which can be modified to meet application specific requirements. The discussion below details only one such application.

Sensor data is gathered by interface modules that communicate the data by a high-speed communication ring 112 to the main module 104 or to a control module 118, where it is manipulated and then stored until downloaded to an off-board control system 114. In the preferred embodiment, two interface modules 106,108 each include two transceivers capable of transmitting and receiving data on the communication ring 112. Since the interface modules 106,108 are connected into the communication ring 112, data can be sent and received by the interface modules 106,108 in either a clockwise or counterclockwise direction. Not only does such an arrangement increase fault tolerance but diagnosis of faults is also improved since the system is better able to identify in which portion of the communication ring 112 a fault may exist. The main module 104 is also advantageously connected in the communication ring 112 in a ring configuration and includes two transceivers.

In the preferred embodiment the other controllers 118 are connected to the communication ring 112 in a bus configuration; however, these controls 118 may also be designed to incorporate a pair of transceivers, such as those included in the interface modules, and to be connected to the communication ring 112 in a ring configuration. The actual order of interface modules 106,108 and other controllers 118 about the communication ring 112 is not critical and is generally selected to economize the overall length of the communication ring 112 and for ease of routing of wires and the communication ring. The communication ring 112 is preferably constructed using a standard twisted-pair communication line and communication conforms to SAE data link standards (e.g., J1587), but other forms of communication lines may also be used.

Subsets of data are also transmitted from the main module 104 to a display module 116 for presentation to the operator in the form of gauges and warning messages. During normal operation, gauge values are displayed in the operator compartment. During out-of-spec conditions, alarms and warning/instructional messages are also displayed. A keypad 126 is provided to allow entry of data and operator commands. One or more alarm buzzers or speakers 128 and one or more alarm lights 130 are used to indicate various alarms. A message area is provided and includes a dot-matrix LCD to display text messages in the memory-resident language and in SI or non-SI units. A dedicated backlight will be employed for viewing this display in low ambient light conditions. The message area is used to present information regarding the state of the vehicle.

While the main, interface, and display modules 104, 106, 116 comprise the baseline vehicle monitoring system 102, additional on-board controls 118, such as engine and transmission controls, are advantageously integrated into this architecture via the communication ring 112 in order to communicate the additional data being sensed or calculated by these controls and to provide a centralized display and storehouse for all on-board control diagnostics.

Two separate serial communication output lines will be provided by the main module 104 of the vehicle monitoring system 102. One line 120, intended for routine uploading and downloading of data to a service tool, will feed two serial communication ports, one in the operator compartment and one near the base of the machine. The second serial line 122 will feed a separate communications port intended for telemetry system access to allow the vehicle monitoring system 102 to interface with a radio system 124 in order to transmit vehicle warnings and data off-board and to provide service tool capabilities via telemetry. Thus the vehicle monitoring system 102 is allowed to communicate with an off-board system 114 via either a direct, physical communication link or by telemetry. In the preferred embodiment, the off-board system 114 includes a microprocessor and is advantageously a commercially available personal computer; however, other types of microprocessor-based systems capable of sending and receiving control signals and other data may be used without deviating from the invention.

The wiring connections of the rear of the connector should be sealed. The ground-level connector should be sealed by a dust and moisture proof spring-loaded cover or removable cap. If removable, the cap would preferably be screw-on with a retaining chain to prevent loss.

Parameter data and system diagnostics are acquired from sensors and switches distributed about the vehicle and from other on-board controllers 118 whenever the ignition is on.

Data is categorized as either internal, sensed, communicated, or calculated depending on its source. Internal data is generated and maintained within the confines of the main module 104. Examples of internal data are the time of day and date. Sensed data is directly sampled by sensors connected to the interface modules 106,108 and include pulse-width modulated sensor data, frequency-based data, and switch data that has been effectively debounced. Sensed data is broadcast on the communication ring 112 for capture by the main module 104 or one or more of the other on-board controllers 118. Communicated data is that data acquired by other on-board controllers 118 and broadcast over the communication ring 112 for capture by the main module 104. Service meter, clutch slip, vehicle load, and fuel consumption are examples of calculated parameters. Calculated data channel values are based on internal, acquired, communicated, or the calculated data channels.

The total number of data channels available for the broadcast of parameters is limited only by the bandwidth of the communication ring 112 that interconnects the various modules and controllers. In the preferred embodiment, the data being transmitted in the communication ring 112 is packetized with headers preceding the data value to identify the data within the packet. The data is preferably fixed format serial bit streams. Each data message being transmitted on the communication ring 112 begins with a Message Identification (MID) character; followed by one or more parameters. In the preferred embodiment, the MID character is replaced by a Source Identification (SID) character and a Destination Identification (DID) character with the SID appearing first in the data stream for ease of arbitration. However, other identification schemes may be used without deviating from the invention.

Each piece of parameter information begins with a Parameter Identification (PID) character followed by one or more parameter data characters. The PIDs may be of various types, including one byte basepage PIDs, two byte basepage PIDs, stringtype basepage PIDs, four byte basepage PIDs, or expanded page PIDs in which two PIDs are used to increase the number of messages capable of being identified. The data message ends with a checksum character. Typically, switch type sensor inputs are associated with the one byte PIDs and the pulse-width modulated and frequency-based sensors are associated with the two byte PIDs.

To document the performance of the machine and/or its major components, performance baselines are stored in an array within the memory device located in the main module 104. These baselines are used during key, repeatable performance checks of the machine to help verify machine/component health and, as discussed below, are used as reference points to determine whether the vehicle is in an operating condition in which vehicle parameters are to be processed and stored.

Data for download to the off-board system 114 from the main module 104 includes a header having a vehicle identifier, a time stamp of the download, and a definition table corresponding to the type of data being downloaded. For example, if trend data is to be downloaded, the definition table is a trend definition.

It should be appreciated by those skilled in the art that data may be processed either on-board the vehicle in the main module 104 and then downloaded, or the data can be first downloaded with the processing occurring in the off-board system. In the preferred embodiment, the system compiles trend data, cumulative data, and histogram data for analysis by service and/or supervisory personnel.

Referring now to FIG. 2, a diagrammatic illustration of a large off-highway mining truck is shown indicating the preferred locations of the interface modules 106,108. It should be appreciated, of course, that the precise location of the interface modules 106,108 are vehicle dependent and are selected by the system designer in response to a plurality of factors including the economization of wire and interface modules, available mounting space, the ability to protect the interface modules from damage, the location of the vehicle sensors and other interface or control modules, etc.

The key design goal, however, is to locate the interface modules in regions of the vehicle having large concentrations of sensors. This allows vehicle system designers to route sensor wires to nearby interface modules for connection to the communication ring 112. Thus, wire length is conserved and the potential for fault conditions arising in the sensor wires is decreased. Of course, sensors are not always connected to the nearest interface module 106,108 since all of the inputs may already be in use or because other design considerations dominate.

Referring now primarily to FIG. 3, the sensors connected to the interface module mounted to the frame of an off-highway truck near the rear of the vehicle is shown. Advantageously, this interface module receives sensor signals from the left and right final drive chip detectors 302, the left and right rear strut sensors 304, the brake master cylinder overstroke switches 306, the brake oil temperature sensor 308, the transmission charge filter switch 310, the torque converter inlet filter switch 312, the hoist screen switches 314, the brake cooling filter switch 316, the transmission oil temperature sensor 318, the transmission lube filter switch 320, the differential oil temperature sensor 322, and the differential chip detector 324. The preceding sensor assignment is associated with the preferred embodiment but should in no way be viewed as limiting the claimed invention. For any given vehicle, the sensors or actuators connected to each of the interface modules 106,108 may be substantially different.

Referring now primarily to FIG. 4, the sensors and actuators connected to the interface module mounted behind and below the operator compartment of an off-highway truck shown. Advantageously, this interface module receives sensor signals from a torque converter outlet screen switch 402, a brake air pressure sensor 404, a jacket water level switch 406, a front brake oil temperature sensor 408, aftercooler temperature sensors 410, a fuel filter switch 412, a torque converter oil temperature sensor 414, an engine oil level switch 416, an engine coolant flow switch 418, turbocharger exhaust temperature sensors 420, a fuel level sensor 422, and front strut pressure sensors 424. Advantageously, this interface module also includes a solenoid driver circuit connected to a solenoid actuator 426 for operation of an automatic lubrication system. The preceding sensor and actuator assignment is associated with the preferred embodiment but should in no way be viewed as limiting the claimed invention. For any given vehicle, the sensors and actuators connected to each of the interface modules 106,108 may be substantially different.

Each interface module 106,108 also includes a right and a left connection to the communication ring 112. Identification code inputs are also advantageously included to allow the microprocessor to determine which sensors are connected to which inputs for each particular vehicle.

While the location of the interface module has been illustrated in connection with off-highway mining trucks, other arrangements are appropriate for other types of vehicles. For example, on mining shovels, the interface modules 106,108 may be located in the engine compartment and in a service area below the operator compartment. Still other locations are advantageously selected for placement of the interface modules 106,108 on over-the-highway trucks and other work vehicles. Even though the preferred embodiment has been described using two interface modules 106, 108, it should be understood that any number of interface modules may be used depending on the number of sensors on the vehicle and the optimum location selection by the vehicle system designers.

Referring now to FIG. 5, a microprocessor 80 included in each of the interface modules 106,108 is shown in connection with a block diagram of the signal processing circuitry for receiving signals from the sensor inputs and conditioning the signals for use by the microprocessor 502. The microprocessor 502 preferably receives inputs from frequency-based sensors 504 in which the signal frequency varies as a function of the sensed parameter, pulse-width modulated (PWM) type sensors 506, and switch type inputs. The microprocessor 502 also advantageously includes the ability to drive an actuator 508.

Signals from a frequency-based sensor 504 are passed through input conditioning circuitry 510 of a type well-known in the art, a low-pass filter 512, a Schmitt trigger 514, a flip-flop 516 designed to divide the frequency in half to allow easier processing, and edge capturing circuitry 518 of a type well-known in the art before being delivered to the microprocessor 502 for storage in a buffer that has been assigned to that parameter.

Signals from a PWM sensor 506 are passed through a low-pass filter 520, a Schmitt trigger 102, signal averaging circuitry 524 of a type well-known in the art, and through an analog to digital converter 526 before being delivered to the microprocessor 502 for storage in a buffer that has been assigned to that parameter.

Signals from switch inputs are passed through a debounce filter 528 of a type well-known in the art before being delivered to the microprocessor 502 that has been assigned to that parameter.

The interface module 106,108 advantageously receives actuator command signals via the communication link 112 to actuate or deactuate one or more solenoid actuators. Such a command typically includes a SID, a DID, a PID, a byte representing the desired actuator state, and a checksum. The microprocessor 502 compares the PID to a configuration table stored in memory to determine which of the actuators to which the interface module is connected is being commanded by the received actuator command signal and which output line is connected to that actuator. The microprocessor 502 then determines the diagnostic state of that actuator by sensing the output of the actuator driver circuit to determine whether there is an open circuit or a short circuit to ground or battery. If the actuator is not in a fault condition, then the microprocessor 502 compares the desired actuator state with the present actuator state. If the desired and present actuator states are not equivalent, then the microprocessor 502 changes the logic state of the output line connected to actuator driver circuitry 110 of a type well-known in the art which responsively actuates and deactuates the solenoid actuator. While the preferred embodiment includes the use of solenoid actuators, it should be understood that other types of actuators may be used without deviating from the invention.

The microprocessor 502 identifies and retrieves data stored in its various buffers in response to a definition table stored in memory. The definition table includes, for each module to receive data from that particular interface module, a destination identifier (DID), a rate byte corresponding to the rate at which data is to be provided, a byte corresponding to the number of parameters for which data is to be provided to the module corresponding to that DID, and a data content byte corresponding to the amount of data to be sent. For each of the parameters for which data is to be sent to the module corresponding to that DID, a prebyte flag is included to indicate that the parameter is described by either a basepage or an expanded basepage PID, and a pointer to the data indicating the buffer location of that parameter data in the microprocessor 502.

Thus during each iteration of the communication software within the microprocessor 502 data is retrieved from the buffer associated with each of the sensed parameters and is composed with the proper identifiers to form a packetized binary sequence for transmission via the communication ring 112. As will be appreciated by those skilled in the art, data may also be transmitted upon request by the main module 104 or by one of the other controls 118. In this case, a message would be received by the interface module from the requesting control in a manner similar to the actuator command signals described above. In response to the request, the microprocessor 502 would retrieve data from the buffer associated with the desired parameter information and would packetize and transmit the desired parameter information as described above. In the preferred embodiment, fault conditions are transmitted on the communication ring 112 by the microprocessor 502 only upon occurrence of a fault.

The data messages transmitted on the communication ring 112 are fixed format serial bit streams. Each data message on the communication ring 112 begins with a Message Identification (MID) character; followed by one or more parameters. Each parameter begins with a Parameter Identification (PID) character followed by one or more parameter data characters. The data message ends with a checksum character. Each character has a start bit, 8 bits of data, and a stop bit. In the preferred embodiment, the MID character includes a Source Identification (SID) character and a Destination Identification (DID) character with the SID being presented first for ease of arbitration.

As described above, the interface modules 106,108 typically include a pair of transceivers, a logic board, and fault detection and status circuitry which collectively allow the interface module to transmit and receive data in either or both of a clockwise and a counter-clockwise direction about the communication ring 112. While other means of connecting an interface module into a communication network in a ring configuration may be used, the preferred embodiment utilizes the system disclosed in U.S. Pat. No. 5,187,709 issued Feb. 16, 1993 to Williamson et al. and entitled "Fault Tolerant Serial Communications Network." Advantageously, the positive and negative data link drivers are supplemented with circuitry to actively pull the data link to the high state. A capacitor, resistor, and transistor are connected to each of the positive and negative data link drivers and collectively introduce increased current to the data link during transitions to the high state. The increased current reduces transition time and consequently allows the use of larger pull-up resistors while still providing short transition times. The larger pull-up resistors decrease the load on the data link and consequently allow more controls to be connected to the communication ring 112 and permit longer distances between controls.

The information manager, as described above, as for exemplary purposes only and in no way limits the scope of the present invention. The present invention is suitable for use on all types of similar information managers. Information managers may have an infinite number and variety of configurations. The present invention allows a non programmer to produce the control software for a particular target information manager, only with the knowledge of the target information manager's specifications.

D. Inputting the Target Information Manager's Specifications

Using the options under the Navigate menu on the Information Systems Builder main screen 602 the operator configures and defines the specification of the target information manager. Each of the options under the Navigate menu is discussed below.

1. Select Model

With reference to FIG. 8, when the operator selects the Model option under the Navigate menu, a Model Selection screen 802 appears. The Model Selection screen 802 includes four drop down lists: Fleet or Site 804, Sales Model 806, Serial Number 808, Version 810 and Description 812. The drop down lists 804,806,808,810,812 are linked to a database. The database includes a list of available options for each field. Furthermore, each downward entry field is dependent upon the previous entry field, e.g., the list of available sales models is dependent upon the fleet or site identified in the Fleet or Site entry field. The database contains a set of default specifications based on the chosen entries in the entry fields. Thus, the operator, by selecting a model via the Model Selection screen can begin configuration of the information manager using a set of default or base parameters.

The screen 602 also includes three buttons which perform the following functions:

"Reset": resets the entries in the entry fields;

"OK": sets the information manager parameters to those contained in the database for the chosen entries in the entry field; and "Cancel": returns to the Information Manager Builder main screen without changing the parameters.

2. Define Parameters

With reference to FIG. 9, when the operator selects the Parameters option from the Navigate menu of the main screen 602, a Parameter Selection screen 902 appears. In one embodiment, the Parameter Selection screen 902 includes a pull-down menu bar 904. a Selected parameter list 906, an Available parameter list 908, an Add push button 910, and a Remove push button 912.

The pull-down menu bar 904 includes the following menus: File and Configure. The pull down menus have the following structure and functions:

| File: | |
|---|---|
| "Save": | opens a screen with the query "Memorize current state?", (Yes, No, Cancel). If "Yes", then a memorize function is performed; |
| "Save As": | opens a screen with the query "Memorize current state?", (Yes, No, Cancel). Saves current configuration to a new file or database. |
| Configure: | |
| "Wiring": | navigates to Wiring screen. See, Part VI.D.2.a. |
| "Data Events": | navigates to Data Events screen. See, Part VI.D.3. |
| "System Events": | navigates to System Events screen. See, Part VI.D.4. |
| "Gauge": | navigates to Gauge screen. See. Part VI.D.2.b. |
| "Units": | navigates to Units screen. See. |
| "Calculate": | Part VI.D.2.c. navigates to Calculated Parameters screen. See, Part VI.D.2.d. |

Additionally, the Parameter Selection screen 902 may include a plurality of tool buttons to automatically navigate to the Wiring, Events, Gauge, Units, and Calculate screens, respectively.

The Add push button 910 removes a selected (highlighted) parameter from the Available list 908 and adds the selected parameter to the Selected list 906. The Remove push 912 removes a selected parameter from the Selected list 906 and adds the selected parameter to the Available list 908. In another embodiment, the pull down menu bar includes a view menu. The view menu has the following structure:

| View: | |
|---|---|
| "All": | lists all parameters available (calculate and non-calculated) in the Available list 908 (less those in the Selected list 906); |
| "Calculated": | list only calculated parameters in the Available list 908 (less those in the Selected list 906); |
| "Measured": | list only measured parameters in the Available list 908 (less those in the Selected list 906). | a. Wiring

With reference to FIG. 10, when the Wiring option under the Configure menu is chosen, the Wiring screen 1002 appears. The Wiring screen 1002 includes a pull down menu bar 1004, a Parameter drop down list 1006, a Part Number drop down list 1008, a Selected interface contact list 1010, and an Available interface contact list 1012. The Wiring screen 1002 also includes a pair of input/output radio buttons 1014, an Add push button 1016, and a Remove push button 1018.

The pull-down menu bar 1004 includes the following menus: File, Options, and view. The pull down menus have the following structure and functions:

| File: | |
|---|---|
| "Save": | opens a screen with the query "Memorize current state?", (Yes, No, Cancel). If "Yes", then a memorize function is performed; |
| "Save As": | opens a screen with the query "Memorize current state?", (Yes, No, Cancel). Saves current configuration to a new file or database. |
| Options: | |
| "Inputs": | navigates to Wiring screen. See, Part VI.D.2.1. |
| "Outputs": | navigates to Events screen. See, Part VI.D.2.1. |
| View: | |
| "All Parameters": | |
| "Unconnected": | |

The Add push button 1016 removes a selected (highlighted) interface contact from the Available list 1012 and adds the selected parameter to the Selected list 1010. The Remove push 1018 removes a selected interface contact from the Selected list 1010 and adds the selected parameter to the Available list 1012.

The Wiring screen 1002 defines the wiring of sensors to interface module contacts. The Parameter drop down list 1014 sets the current parameter or output name if the current device is an output device. The Part Number drop down list 1008 sets the part number of the sensor (if an input device). If the device is an output device, the field is blank. The radio buttons 1014 defines the current device as an input or output device. The device may also be configured by using the Options menu.

The Available interface contact list contains a list of all interface contacts which are available less the interface contacts which have already been assigned. The interface contacts listed in the Available interface contact list contain the following information: Interface module-Contact type-Contact number.

The Selected interface contact list contains a list of all interface contacts which have been previous assigned. The interface contacts listed in the Selected interface contact list contain the following information: Interface module-Contact type-Contact number-Sensor name.

If the Wiring screen 1002 is invoked from the Parameter Selection screen 902, then the Parameter drop down list 1006 contains all the parameters listed in the Selected parameter list 906. Additionally, if a parameter is highlighted (selected) in the Selected parameter list 906 when the Wiring screen 1002 is invoked, the selected parameter is the default parameter.

If the Wiring screen 1002 is invoked from the Module Selection screen (see below), then the Part Number drop down list 1008 continues all of the modules selected on the Module Selection screen. Additionally, if a module is selected/highlighted on the Module Selection screen, that module becomes the default module in the Part Number drop down list 1008.

When the option "Unconnected" is chosen in the view menu, the Available interface contact list 1012 contains only those contacts which are unassigned. When "All Parameters" is chosen in the view menu, the Available interface contact list 1012 contains all of the contacts.

The database contains predefined sensor information, i.e., part numbers and associated data. Additionally, the database includes interface module (contact) information. In the preferred embodiment, there are two types of modules (type A pin configuration modules and type B pin configuration modules).

b. Gauges

With reference to FIG. 11, when the Gauge option under the Navigate menu of the Define Parameters screen is selected, a Gauge Configuration screen 1102 appears. The Gauge Configuration screen 1102 defines the manner in which information relating to a specific parameter is displayed on a gauge. The Gauge Configuration screen 1102 includes a parameter name drop down list 1104, a minimum value entry box 1106, a maximum value entry box 1108, a first red zone check box 1110, a second red zone check box 1112, a first red zone value entry box 1114, a second red zone entry value box 1116, a first zone range entry field 1118 and a second zone range entry box 1120.

The parameter name drop down list 1104 contains a list of parameters which can be associated with the gauge. The minimum and maximum value entry boxes 1106,1108 define the values for the end display values for the gauge for the parameter selected in the parameter name drop down list 1104. The first and second red zone check boxes 1110,1112 indicate whether a first and/or second red zone will be displayed for the given parameter. The first and second red zone entry boxes 1118,1120 define the size of the first and second red zones, respectively. The first and second zone range entry fields 1118,1120 allow value to be assigned to display segments on the gauge.

c. Units

With reference to FIG. 12, when the Units option under the Navigate menu of the Define Parameters screen is selected, an On Board Units screen 1202 appears. The On Board Units screen 1202 includes a parameter name drop down list 1204, an Imperial units drop down list 1206, and a Metric units drop down list 1208. The On Board Units screen 1202 defines the on board display units for the selected parameter. Generally, display values are stored in one form, but may be displayed in several forms. Each parameter has an associated default parameter unit. Based on the default parameter unit, a conversion to one or more other units is possible, for example, kilometers per hour may be converted to miles per hour or feet per second.

Only one of the Imperial drop down list 1206 or the Metric drop down list 1208 is active at any one time. When a parameter is selected its default unit is displayed. If the default unit is metric, the metric unit is displayed in the Metric drop down list 1208 and the Metric drop down list 1208 is deactivated. Accordingly, the Imperial drop down list is active and contains the valid conversion units. Likewise, if the default unit is Imperial, the Imperial unit is displayed in the Imperial drop down list 1206 and the Imperial drop down list 1206 is deactivated. Accordingly, the Metric drop down 1208 list is active and contains the valid conversion units.

Additionally, each drop list (when active) contains not only the valid conversion units, but a "New" option. With reference to FIG. 13, when the New option is selected the Create Unit Association screen 1302 appears. The Create Unit Association screen 1302 includes an Imperial unit entry field 1304, a Metric unit entry field 1306, a slope entry field 1308, and an intercept entry field 1310. Entry of appropriate data defines a new conversion from a default unit to the newly defined unit.

d. Calculated Parameters

With reference to FIG. 14, when the Calculated Parameters option under the Navigate menu of the Define Parameters screen is selected, a Calculated Parameters screen 1402 appears. The Calculated Parameters screen 1402 includes a Calculation name list 1404, an internal representation field 1408, and an Equation entry field 1406. The Calculation name list 1404 includes a list of calculations which have been defined by the user ("0", "1", "2", "3", "4" are for illustrative purposes only). The Calculated Parameters screen 1402 also includes a "Remove" button 1410 and a "New" button 1412. When the Remove button is selected, the currently selected Calculation is deleted.

With reference to FIG. 15, when the New button is selected, a Calculate Parameter screen 1502 appears. The Calculate Parameter screen 1502 includes first and second expression panes 1504,1506, a parameter list 1508, a set of function keys 1510, and a set of numeric keys 1512. The parameter list 1508, set of function keys 1510, and set of numeric keys 1512 are used to define a mathematical expression associated with the calculation name defined in the Calculated Parameters screen 1402. In the preferred embodiment, reverse notation is used. Additionally, the function keys have the following meanings:

| | |
|---|---|
| "+": | addition; |
| "−": | subtraction; |
| "*": | multiplication; |
| "/": | division; |
| "=": | is equal to comparison; |
| "!=": | is not equal to comparison; |

-continued

| | |
|---|---|
| "<=": | is less than or equal to comparison; |
| ">=": | is greater than or equal to comparison; |
| ">": | is greater than comparison; |
| "<": | is less than comparison; |
| "&": | bitwise and; |
| "!": | bitwise or; |
| "%": | modulo; |
| "abs": | absolute value; |
| "&&": | logical and; and |
| "‖": | logical or. |

3. Define Data Events

With reference to FIG. 16, when the Events option under the Navigate menu is selected, a Data Event Selector screen 1602 appears. The Data Event Selector screen 1602 includes a Parameter name drop down list 1604, an event list 1606, a "New" push button 1608, and a "Modify" push button 1610. The Parameter name drop down list 1604 identifies the current parameter. The event list 1606 includes a list of those data events which have defined by the user. A data event is an event associated with data i.e., relating to a specific parameter. For example, a data event may be defined where a particular parameter breaches a defined range. Additionally, a data event may be defined by two or more parameters. For example, a data event may be defined where two parameters breach defined ranges. In the event such data events occur, the defined message(s) is (are) displayed and/or alarms are actuated.

a. Data Event Configuration

With reference to FIG. 17, when either the New push button 1608 or the Modify push button 1610 is pushed, a Data Event Configuration screen 1702 appears. The Data Event Configuration screen 1702 includes a pull down menu 1704, primary parameter descriptions fields 1708, secondary parameter description fields 1710, and third parameter description fields 1712.

The pull down menu 1704 has the following structure:

| | | |
|---|---|---|
| File: | | |
| | New Event: | creates a new event; |
| | Reset: | erases the current entry fields; |
| | OK: | saves the current event and returns to the data event selector screen 1602; |
| | Cancel: | returns to the data event selector screen 1602; |
| | Memorize: | saves the current event. |
| Edit: | | |
| | Copy: | copies all fields to a temporary object; |
| | Paste: | copies temporary object to the current event. |
| Configure: | | |
| | Delay: | navigates to the Data Event Delays screen. See, Part VI.D.3.b. |
| | Options: | navigates to the Data Event Options screen. See, Part VI.D.3.c. |
| | Meg/Alarms: | navigates to the Data Event Messages/alarms screen. See, Part VI.D.3.d. |

The primary parameter description fields 1708, secondary parameter description fields 1710, and the third parameter description fields 1712 define the triggering event. The primary parameter description fields 1708 include a parameter name drop down list 1714, an operation drop down list 1716, an actuate entry field 1718 and a deactuate entry field 1718. A data event requires a primary parameter. For example, a data event may be defined where engine rpm (parameter) is greater than (operation) 5000 rpm (actuate). The deactuate entry field 1718 defines the endpoint of the data event, i.e., until [deactuate].

The secondary parameter description fields 1710 may be utilized to further define the data event. The secondary parameter description fields 1710 include a check box 1722, a parameter name drop down 1724, an operation drop down list 1726, and an actuate entry field 1728. For example, if the check box 1724 is indicated, the data event may be defined where: engine rpm is greater than 5000 rpm and gear ratio (parameter) is equal to (operation) 2 (actuate).

The third parameter description fields 1712 may be utilized to even further define the data event. The third parameter description fields 1712 include a check box 1730, a parameter name drop down 1732, an operation drop down list 1734, and an actuate entry field 1736. The third parameter description fields 1712 work in a manner similar to the secondary parameter description fields 1710.

b. Data Event Delays

With reference to FIG. 18, when the Delays option is selected from the configure menu on the Data Event Configuration screen 1702, a Data Event Delays screen 1802 appears. The Data Event Delays screen 1802 allows various delays related to the current data event to be set and defined. In the preferred embodiment, the Information Manager Builder allows the following delays to be actuated and defined:

| | |
|---|---|
| 1. delay after engine starts: | defines a time period after the engine starts during which the event is not checked; |
| 2. delay to display/log event: | if the event is to be logged or displayed, defines a delay before such is done; |
| 3. delay to turn off event: | turns off the event after a set time period; |
| 4. delay to remind operator: | turns on a reminder after a set time period; |
| 5. delay to turn on service light: | if the event is defined to turn on the service light, defines a delay before such is done. |

Each delay has an associated check box 1802, an associated slider 1804, and an associated entry field 1806. The check boxes set and un-set each delay. The sliders 1804 and entry fields 1806 allow the length of the delays to be defined. The slider bars 1804 are used to continuously increase/decrease a particular delay. The entry fields 1806 are used to enter a delay numerically.

c. Data Event Options

With reference to FIG. 19, when the Options option is selected from the configure menu on the Data Event Configuration screen 1702, a Data Event Options screen 1902 appears. The Data Event Options screen defines the action(s) to be taken once the current data event has occurred. In the preferred embodiment, the following options are enabled:

| | |
|---|---|
| 1. Latch event recorder: | turns on the event recorder to record sensor information; |
| 2. Broadcast: | broadcasts an error code over the datalink; |
| 3. Store: | stores an error code associated with the data event; |
| 4. Machine abuse: | stores an abuse code. |

The Data Event Options screen 1902 includes a series of check boxes 1904 which are used to enable the respective data event options. Note that more than one option may be enabled.

d. Data Event Messages/Alarms

With reference to FIG. 20, when the Meg/Alarms option is selected from the Configure menu on the Data Event Configuration screen 1702, a Data Event Messages/Alarms screen 2002 appears. The Data Event Messages/Alarms screen 2002 configures the messages and alarms which are associated with the current data event. In the preferred embodiment, there are four different alarm states: (1) silent alarm, (2) alert indicator, (3) action light, and (4) action alarm. Each alarm level has associated indicator lights which are lit and/or alarm buzzers which are actuated in response to triggering of the associated event. In the preferred embodiment, the alarm levels are arranged in a progressive list, i.e., selection of an alarm level selects all alarm levels above, for example, selection of the Action light alarm level automatically selects the silent alarm and alert indicator alarm levels as well. The Data Event Messages/Alarms screen 2002 includes a series of check boxes 2004 corresponding to each alarm level. Additionally, the Data Event Messages/Alarms screen 2002 includes one or more message entry fields 2006 which correspond to various message displays on the Information Manager. Entry of text in the message entry fields defines the messages which are displayed when the current data event is triggered.

4. System Events

When the System Events option under the Navigate menu is selected, a System Event Selector screen (not shown) 1602 appears. A system event is an event associated with the information manager system or hardware, i.e., the sensors, other control modules. For example, a system event may be defined when information is not being received from a particular sensor or control module, indicating a fault. System events are defined in a manner similar to that of Data Events. Thus, the ISB includes a System Event Configuration screen, a System Event Delays screen, and a System Event Options (not shown). Each works substantially the same as the corresponding data event screen.

5. Configure Keypad

With reference to FIG. 21 when the Keypad option under the Navigate menu of the main screen 602 is selected, a Keypad screen 2102 appears. The Keypad screen 2102 is used to configure service program codes. During operation of the Information Manager, certain operations can be initiated from the keypad. The operations are started by entering a service program code on the control keypad. The service program code is a numeric code that represents an operation command. The service program codes are defined via the Keypad screen 2102.

The Keypad screen 2102 includes a command drop down list 2104 and a Service code entry field 2106. The command drop down list 2104 includes a list of all available service programs (for the available configuration). The user inputs the service code to be associated with the selected command in the Service code entry field 2106. An alphanumeric keypad 2108 is also provided. Note an alpha code may be entered, but it will be represented numerically.

6. Module

With reference to FIG. 22, when the Module option under the Navigate menu of the main screen 602 is selected, a Module Selection screen 2202 appears. The Module Selection screen 2202 is used to define the list of available input modules for the target Information Manager configuration. The Module Selection screen 2202 includes an Available Module list 2204, a Selected Module list 2206, a "NEW" pushbutton 2208, an "ADD" push button 2210, and a "REMOVE" pushbutton.

The Available Module list 2204 includes a list of all available interface modules (from a database) less those in the Selected Module list 2206. Selection of the NEW pushbutton adds a newly defined interface module to the Available Module list 2204. Selection of the ADD pushbutton removes the selected interface modules from the Available Module list 2204 and adds the interface modules to the Selected Module list 2206. Selection of the remove pushbutton removes the selected interface modules from the Selected module list 2206 and adds them to the Available Module list 2204.

The Module Selection screen 2202 also includes a filter entry field which allows designation of a filter (if any) connected between the target information builder and the interface module.

7. Other Functions

Additionally, the Information Systems Builder provides for defining the capturing of specific types of data. That is, the Information Manager may have the capability of storing trend, histogram, or prognostic data. The Information Systems Builder thus is able to define the data to be captured and other information related to these specific types of data.

8. Arrangement of Menus and Tool Buttons

With reference to FIGS. 7–22 and the above discussion, the referenced arrangement of pull down menus, screens, and tool buttons is for illustrative purposes only. The arrangement of the pull down menus, screens and tool buttons have numerous possible arrangements. Therefore, the present invention is not limited to any specific arrangement thereof.

E. Security

The Information Systems Builder has many uses and is designed to be used by design engineers, manufacturing engineers, and (for limited purposes) by the operators/owners of the machines. For safety reasons specific users should only be allowed to change/modify/specify certain specific parameters or specifications. Thus, the Information Systems Builder includes a security system which deactivates predefined portions of the builder based on the type of user, i.e., their security level.

F. Producing the Control Software

Once the parameters and specifications of the target information manager have been designated by the user, the data must be converted into a form useable by the Information Manager. In the preferred embodiment, the software which is run on the target information manager is divided into at least two portions: the control code and a binary file containing parameter and configuration information. The control code is generally static and may already be loaded onto the target information manager. Thus, only the information which is modifiable via the Information Systems Builder need be formatted. In the preferred embodiment, the user specified information and all relating/required information is placed in a binary file. The binary file is then uploaded to the target information builder. Uploading the binary file to the target information builder may be accomplished by any appropriate means.

VII. Industrial Applicability

With reference to the drawings, and in operation, the Information Systems Builder is adapted to produce the software for a vehicle monitoring system 102. The vehicle monitoring system 102 is adapted for communication to and between a main module, one or more interface modules 106,108, and one or more other control modules 118. Such a system is particularly useful in connection with large work vehicles having a plurality of sensors monitoring vehicle parameters.

A user of the Information Systems Builder need not have any programming experience. The user simply inputs the specifications and parameters of target information manager using the screens of the Information Systems Builder. After this process is completed, the Information Systems Builder creates a binary file. The binary file is then uploaded to the target information builder and combined with pre-assembled software code.

The Information Systems Builder is useful in many different situations. The Information Systems Builder may be used in the design of a new application based on the common platform. The Information Systems Builder creates a binary file containing the parameter and specification data. The binary file and the pre-assembled code are then tested in the target information manager. The Information Systems Builder may also be used to develop and distribute updates to the code of information managers which are already being used. Additionally, the Information Systems Builder may be used during the manufacture of new machines. Not only does each machine model have different requirements, but each individual machine may have different requirements based on machine option, ultimate work site of the machine, and/or customer preference. The Information Systems Manager allows the software to be run on the information manager to be produced without the input of a software engineer.

Other aspects, objects, advantages and uses of this invention can be obtained from a study of the drawings, disclosure, and appended claims.

We claim:

1. A method of operating a computer to automatically produce control software for an information manager on a machine, the information manager having a microprocessor, the control software being adapted to run on the microprocessor to display information relating to the machine, the method including the steps of:

(1) as a function of operator input, defining a set of information manager specifications, wherein said set of information manager specifications includes a primary machine parameter to be sensed by the information manager, an event and corresponding action, wherein said event is a function of said primary machine parameter; and (2) producing control software to operate the information manager as specified by said specifications and to perform Said action if said one event occurs.

2. A method, as set forth in claim 1, wherein said set of information manager specifications includes:

parameters; and gauges.

3. A method, as set forth in claim 2, wherein said step of defining events includes the steps of:

(3)(a) specifying a current parameter for a current event;

(3)(b) defining an operation and an actuate value relating to said current parameter, said operation and actuate value relating to said current parameter defining triggering of said current event.

4. A method, as set forth in claim 2, wherein said step of defining events includes the steps of:

(3) (c) specifying a secondary parameter for said current event;

(3) (d) defining an operation and an act, said operation and actuate value relating to said secondary parameter further defining triggering of said current event.

5. A method, as set forth in claim 2, wherein said step of defining events includes the step of defining at least one delay associated with a current event.

6. A method, as set forth in claim 2, wherein said step of defining events includes the step of defining one or more actions to be taken when an event is triggered.

7. A method as set forth in claim 2, wherein said step of defining events includes the step of defining an alarm level associated with a current data event.

8. A method, as set forth in claim 2, wherein said step of defining parameters includes the steps of:

(2)(a) defining measured parameters; and (2)(b) defining calculated parameters.

9. A method, as set forth in claim 8, wherein the information manager is connected to at least one interface module and wherein the step of defining measured parameters includes the step of defining sources of said measured parameters and connection of said sources to said at least one specific interface module.

10. A method, as set forth in claim 8, including the step of define a method of calculation for said calculated parameters.

11. A method, as set forth in claim 2, wherein said step of defining parameters includes the step of assigning a unit of measurement to a current parameter.

12. A method, as set forth in claim 2, including the step of configuring a gauge to display information.

13. A method, as set forth in claim 2, wherein the information manager includes a keypad for entering information and including the step of assigning service program codes to operation command of the information manager.

14. A method, as set forth in claim 1, including the steps of:

(3) as a function of operator input, defining a configuration of the machine; and (4) setting the set of information manager specifications to defaults as specified by said configuration.

15. A method, as set forth in claim 14, wherein said configuration of said machine includes fleet information.

16. A method, as set forth in claim 14, wherein said configuration of said machine includes site information.

17. A method, as set forth in claim 14, wherein said configuration of said machine includes machine model information.

18. A method, as set forth in claim 14, wherein said configuration of said machine includes fleet information.

19. A method, as set forth in claim 1, wherein said step of defining a set of information manager specifications includes the steps of:

(3) defining data events, said data events being functions of parameters; and (4) defining system events, said system events being functions of said information manager.

20. A method, as set for in claim 1, wherein said event includes a primary parameter, an operation, and an actuate field.

21. A method, as set forth in claim 20, wherein said event occurs if said primary parameter and said actuate field have a relationship as defined by said operation.

22. A method, as set forth in claim 1, wherein said action is defined, by said user, as at least one of:

recording sensor information;

producing an error code; and storing an error code.

23. A method of operating a computer to automatically produce control software for an information manager on a machine, the information manager having a microprocessor, the control software being adapted to run on the microprocessor to display information relating to the machine, the method including the steps of:

(1) as a function of operator input, defining a configuration of the machine; and (2) setting a set of information manager specifications to defaults as specified by said configuration.

(3) as a function of operator input, modifying said a set of information manager specifications, said information manager specification including:
   (a) data events, said data events being functions of parameters;
   (b system events, said system events being functions of said information manager;
   (c measured parameters;
   (d calculated parameters; and
   (e gauges; and (4) producing control software to operate the information manager as specified by said system and data events, measured and calculated parameters, and gauges.

* * * * *